UNITED STATES PATENT OFFICE.

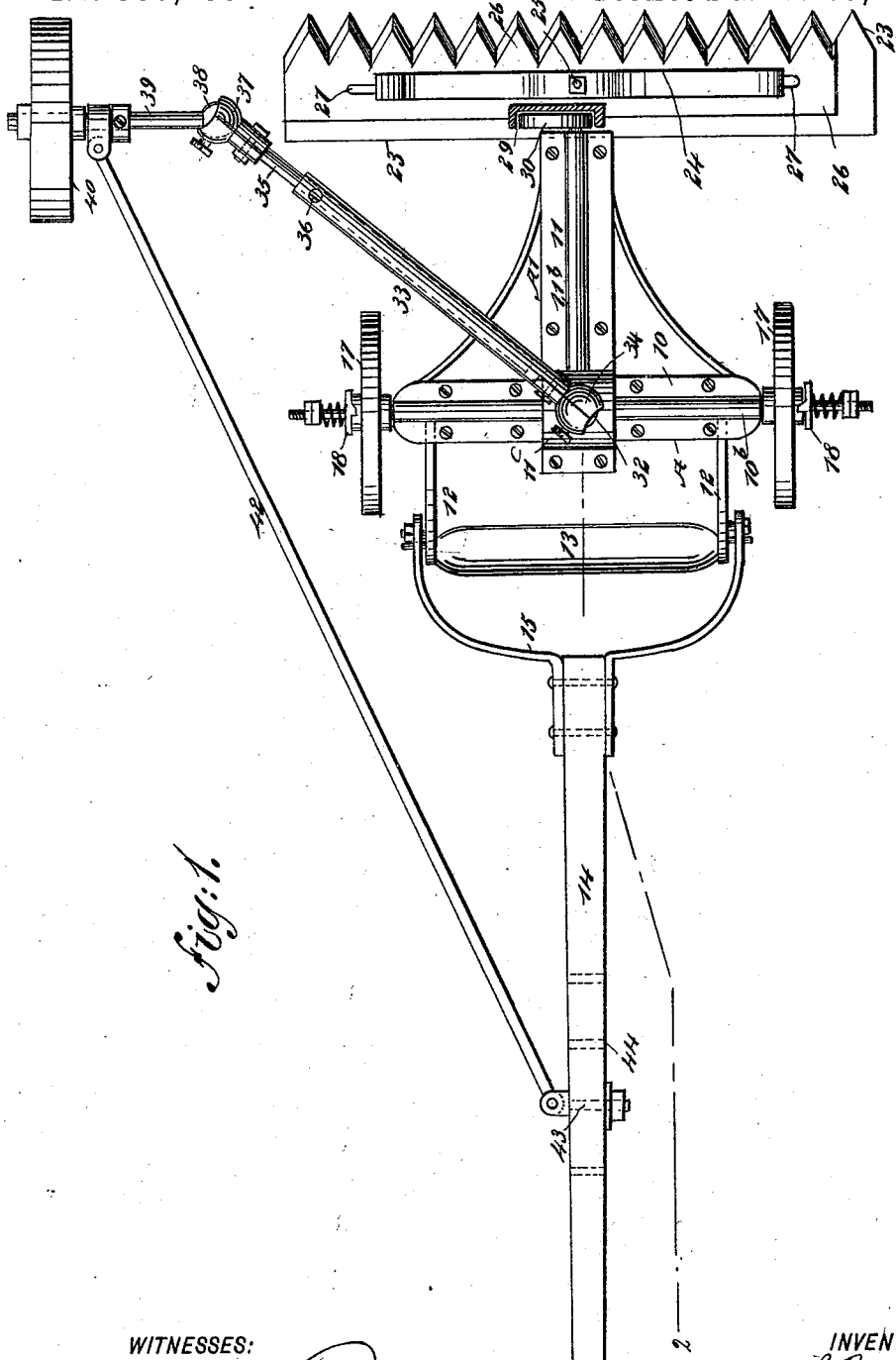

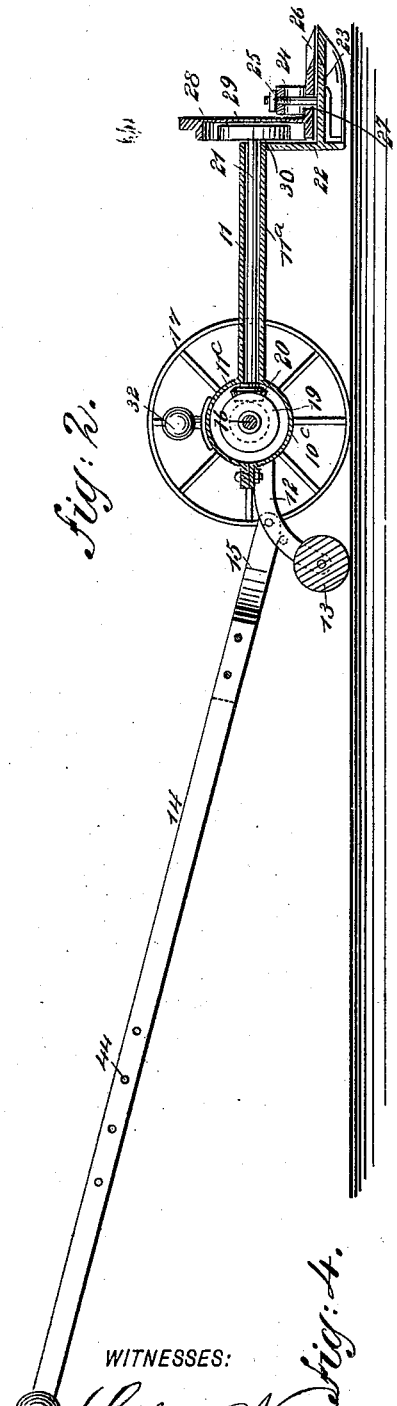

WILLIAM JAMES RUSK AND CHESTER LOCKWOOD HOLLOWAY, OF HUNTER, NEW YORK.

LAWN-MOWER.

SPECIFICATION forming part of Letters Patent No. 550,138, dated November 19, 1895.

Application filed April 13, 1895. Serial No. 545,617. (No model.)

*To all whom it may concern:*

Be it known that we, WILLIAM JAMES RUSK and CHESTER LOCKWOOD HOLLOWAY, of Hunter, in the county of Greene and State of New York, have invented a new and useful Improvement in Lawn-Mowers, of which the following is a full, clear, and exact description.

Our invention relates to an improvement in lawn-mowers; and the object of the invention is to construct a lawn-mower which will be simple, durable, and economic, and which will cut grass of any height evenly with one cut and leave the grass on the lawn or other place mowed of uniform length.

Another object of this invention is to provide a means whereby the driving mechanism of the mower will be protected against dust, and whereby, also, the machine may be adjusted to travel longitudinally of a terrace as well as transversely thereof.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the improved mower, the race connected with the movable knife being in section. Fig. 2 is a longitudinal vertical section taken substantially on the line 2 2 of Fig. 1. Fig. 3 is a front elevation of the mower, illustrating it as adapted for traveling longitudinally along a terrace; and Fig. 4 is a detail view of the connection between the axle and the driving-shaft of the movable knife.

In carrying out the invention the frame of the mower is substantially a T-frame, comprising a transverse member A and a longitudinal member A'. The transverse member A is made in two sections 10 and $10^a$, the said sections being bolted or otherwise secured together, one being placed over the other, and each section is provided with a longitudinal central channel $10^b$, and the lower section of the said transverse member, as shown in Figs. 2 and 4, is provided with a well $10^c$ at its center. The longitudinal frame member A' is likewise constructed in two sections 11 and $11^a$, each being provided with a longitudinal channel $11^b$, and the upper member 11 is further provided at its rear end with an inverted well $11^c$, adapted to be secured over and close the well $10^c$ in the transverse member of the frame, forming thereby a circular casing, as shown in Fig. 2.

Arms 12 are projected rearwardly and downwardly from the transverse member of the frame designated as A, and carry at their lower ends a roller 13, while the handle 14, by means of which the machine is propelled, is connected by a yoke 15 with the aforesaid rearwardly-extending arms 12.

An axle 16 is held to turn in the channeled portions $10^b$ of the transverse frame member and extends beyond the ends of said member, having a ground-wheel 17 loosely mounted near each outer extremity, and the outer face of the hub of each ground-wheel is provided with a clutch-face to receive a spring-controlled clutch 18, the teeth of the clutch being so constructed that they will compel the axle to turn with the wheels when the machine is pushed forwardly; but when the machine is drawn rearwardly or backwardly the clutch-teeth simply slip by the said hubs.

Within the combined wells $10^c$ and $11^c$ a beveled gear 19 is secured on the axle 16, being made to mesh with a beveled pinion 20, likewise located in the said wells and secured upon the rear end of the drive-shaft 21, journaled in the channeled portions $11^b$ of the longitudinal frame member A'. It will be observed that under this construction the lower well may be filled with oil to such an extent as to keep the gears lubricated for a great length of time.

A hanger 22 is projected downward from the forward end of the frame, as shown best in Fig. 2, and a knife 23 is secured firmly to the said hanger and is held in a horizontal position, the knife being of such length that it extends beyond the front faces of the ground-wheels. The fixed knife is provided with the usual pointed teeth at its forward edge, the teeth having beveled surfaces, the bevel being in a downwardly direction. The fixed knife 23 is strengthened by an arched brace 24, and the said brace is held above the said knife both at its center and at its ends by means of pins or bolts attached to the brace and made fast to the body of the knife, the central pin being designated as 25, and it is shown in Figs. 2 and 3. A second knife 26 is held to reciprocate directly upon the upper face of the fixed knife, being provided with pointed teeth beveled in an upwardly direction and adapted to fit over the teeth of the fixed knife, the teeth of both knives being substantially of the same size. The reciprocating knife is provided with slots 27, produced at or near its ends and at the center, the bolts of the brace 24 passing downward through these slots, and the said bolts serve to limit the end movement of the reciprocating knife. A standard 28 is projected upward from the rear central portion of the reciprocating knife, being provided with a longitudinal groove or race 29 in its rear face. This groove or race does not extend through either end of the standard, as shown in Fig. 2, and is adapted to receive a cam 30, secured to the forward end of the drive-shaft 21; but a crank-disk and pin may be substituted. Thus it will be observed that the crank-disk virtually keeps the slot 29 in the standard covered, and by excluding the dust prevents wear of the disk 30 and undue friction.

A ball 32 is secured upon the upper portion of the upper well-section 11°, being adapted to enter a socket 34, formed in one end of an arm 33, the arm being adapted to extend horizontally in direction of one or the other side of the machine. A second arm 35 is introduced into the arm 33, which is tubular, and a set-screw 36 will hold the two arms in fixed relation to each other. The arm 35 at its outer end is provided with a socket 37, adapted to receive a ball 38, formed upon the inner end of an auxiliary axle 39, which is provided at its outer end with a small ground-wheel 40. The sockets receiving the balls are made in sections and are connected by bolts in order that they may be disconnected from the balls they are adapted to receive, enabling the arms 33 and 35 and the auxiliary axle 39 to be detached from the body of the machine, these parts being especially adapted to guide the machine when it is used to mow longitudinally upon a terrace, as illustrated in Fig. 1.

The ball-and-socket connections are rendered fixed by means of set-screws 41. A brace-rod 42 is loosely mounted on the auxiliary axle 39 and is carried rearward, being provided at its rear end with a pivotally-connected bolt 43, adapted to enter any one of a number of openings 44 made in the handle, so that the telescopic arms 33 and 35 may be lengthened or shortened to bring the auxiliary wheel 40 on the top of the terrace, and the various parts of this terrace-guiding attachment, owing to their ball-and-socket connections, may be given any inclination that the character of the ground may demand.

Owing to the fact that the knives play one upon the other and are without shoes, and, furthermore, as the knives are placed in front of the ground-wheels and extend beyond the outer faces of said wheels, the knives will cut the grass equally well whether the grass be long or short and will leave the lawn or the surface over which the machine is passed with the grass evenly cut and of uniform length. Furthermore, it is obvious that by removing the brace-rod 42 from engagement with the handle 14 the terrace attachment may be carried over to the right or to the left of the machine or made to take any desired position that the character of the terrace may demand. The auxiliary wheel 40, traveling on the top of the terrace, will guide the machine longitudinally on the inclined face of the terrace and will materially assist the operator in keeping the machine straight.

Having thus described our invention, we claim as new and desire to secure by Letters Patent—

1. In a lawn mower, a hill-side or terrace attachment comprising an arm carrying an auxiliary ground wheel the said arm having pivotal connection with the frame of the machine over the main driving axle whereby the auxiliary wheel may be adjusted vertically and also transversely with relation to the main ground wheels, and means for securing the auxiliary wheel as adjusted, as and for the purpose set forth.

2. In a lawn mower, a hill-side or terrace attachment, comprising an arm adapted for adjustable attachment to the machine, and an auxiliary axle provided with an auxiliary ground wheel, the auxiliary axle having adjustable connection with the said arm, as and for the purpose specified.

3. In a lawn mower, a hill-side or terrace attachment, the same consisting of an extensible arm having a socket formed at the outer end of each member, adapted to receive a ball, an auxiliary axle provided with a ball at one end entering one of the sockets, an auxiliary ground wheel mounted on said axle, and an adjustable brace connecting the auxiliary axle with a support on the mower, as and for the purpose set forth.

WILLIAM JAMES RUSK.
CHESTER LOCKWOOD HOLLOWAY.

Witnesses:
  Z. L. WILCOX,
  G. C. McKELVIE.